United States Patent [19]

Beer

[11] 4,110,609

[45] Aug. 29, 1978

[54] TILT LIMITING DETECTING APPARATUS

[75] Inventor: Emmanuel Emil Beer, Eastchester, N.Y.

[73] Assignee: The Singer Company, Little Falls, N.J.

[21] Appl. No.: 734,906

[22] Filed: Oct. 22, 1976

[51] Int. Cl.² .............................................. G01D 5/34
[52] U.S. Cl. .................................. 250/231 R; 33/366
[58] Field of Search ............. 250/231 R, 577; 33/366; 73/398, 401

[56] References Cited

U.S. PATENT DOCUMENTS

| 3,204,233 | 8/1965 | Olliff ...................................... 33/366 |
| 3,324,564 | 6/1967 | Wright ................................... 33/366 |
| 3,813,556 | 5/1974 | Beer et al. ............................ 250/577 |
| 3,863,067 | 1/1975 | Gooley ............................. 250/231 R |

Primary Examiner—David C. Nelms
Attorney, Agent, or Firm—Thomas W. Kennedy

[57] ABSTRACT

A tilt limit detecting apparatus which includes an elongated vial containing an opaque liquid with a bubble therein and light source-photo transistor pairs at each end aligned to intersect the bubble when the vial is tilted and in which the vial has a cross section which results in the optical axes between the light sources and photo transistors intersecting the vial at an angle which at least approaches 90°.

12 Claims, 11 Drawing Figures

TILT LIMITING DETECTING APPARATUS

BACKGROUND OF THE INVENTION

This invention relates to tilt limit detecting apparatus in general and more particularly to an improved tilt limit detector which is capable of withstanding higher degrees of shock and vibration.

A tilt limit detecting apparatus is disclosed in U.S. Pat. No. 3,813,556 in which a bubble level contains a prescribed amount of opaque fluid and a photo detector arrangement transverse to the longitudinal axis is provided to sense bubble movement in response to tilting of the device. The photo detector arrangement includes a pair of light source-photo cells combinations, the first of which is normally positioned at the center of the bubble in the level position with the second combination spaced the distance $y$ from the first such that the distance $y$ is less than the bubble length $x$. The opaque fluid acts as a shutter interposed between the light source-photocell combinations so that with the connection of suitable electronic circuitry to the photocells angular tilts in excess of the allowable limit which generally equals $x/2$ in radians are detected as well as the particular direction, clockwise or counterclockwise identified.

Although this device works well in some applications it suffers from a number of deficiencies. Since its principle of operation is based on bubble size i.e., the bubble length must be larger than the light source-photocell combination spacing, it is unsuitable for a switch with a great length of bubble travel, large tilt switching angles and consequently for a switch to endure environmental adversities. During shock and vibration the deformation of the bubble and its switching travel length are closely related. Thus, the switch disclosed in the aforementioned patent is not recommended for dynamically affected vehicles, platforms or devices. The described switch was designed primarily for a static condition.

In view of these deficiencies of the prior art device the need for an improved tilt limit detecting apparatus of this nature which is capable of operating with great lengths of bubble travel and is not susceptible to shock and vibration becomes evident.

SUMMARY OF THE INVENTION

The present invention provides such a tilt limit detecting apparatus. In accordance with the present invention a long vial filled with an opaque liquid with a bubble formed therein is utilized along with a photo detector arrangement which has a pair of light source-photo transistor combinations one at each vial end. At the level position of the switch the bubble remains in the center position of the vial. The degree of tilt which will result in the bubble moving to a point where it will intersect the light source-photo transistor combination and thus in a sense open the shutter, is a function of vial curvature. This controls the amount of tilt detected along with the amount of bubble movement. Theoretically, in a straight vial the length of travel tends toward infinity after the least amount of tilt. Because a long vial is used and the sensors placed at the ends in an adverse dynamic environment when at the central level position of the bubble, deformation of the bubble cannot reach far enough apart to intersect the light source-photo transistors combination and generate outputs. Similarly, angular deflection caused by a vibration frequency will not cause instantaneous bubble movement toward the vial ends.

In additin to its improved arrangement with respect to the length and placement of the detectors, the present invention provides another improvement which relates to the shape of the vial itself. Typically, in the prior art cylindrical shaped vials have been used. A problem results because of the angle at which the light on the light source-photo detector intersects the glass cylinder. Because of the angle of intersection, refraction through the glass becomes possible and repeatable results cannot always be assured. It must be remembered that the bubble is in the top of the vial and at that point the vial has a large degree of curvature. In accordance with the present invention a vial which does not have as great curvature at the point of intersection of the light from the light source is utilized. Such a vial may be in a square shape, rectangular shape, oval shape or the like. By so shaping the vial, problems and unwanted light being refracted through the vial are avoided.

DETAILED DESCRIPTION OF THE PREFERRED EMBODIMENT

Figure 1:
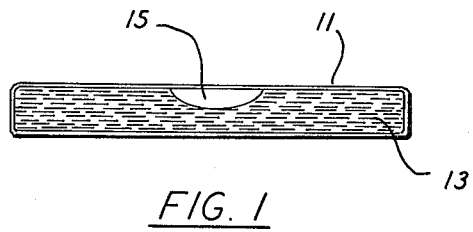
FIG. 1 is a longitudinal elevational view of the vial of the tilt limiting detecting apparatus of the present invention.

FIG. 1 illustrates an elevation view of the vial of the present invention. As illustrated, it includes a glass vial 11 which is filled with an opaque liquid 13 with enough air left to form a bubble 15. The vial shown is straight, i.e., it has no curvature. As noted above, such a vial, theoretically will result in the bubble 15 moving to infinity with the slightest amount of tilt. Generally, some curvature will be provided, the degree determined by the amount of angle which it is desired to detect. For small angles, the vial can be made with the curvature built in, i.e., it will be straight on the outside but have curved surfaces on the inside. For larger angles the whole vial itself may be curved.

Figure 2A:
FIGS. 2a, b, and c are cross sections through the device of FIG. 1 illustrating various shapes which may be used in accordance with the present invention.
Figure 2B:
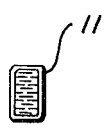
Figure 2C:

FIGS. 2a, b, and c illustrated various cross sections which may be used for the vial 11 to avoid unwanted refraction through its walls. As illustrated by FIG. 2a the vial may be square or, as illustrated by FIG. 2b rectangular or, as illustrated by FIG. 2c in an oval shape.

Figure 3:
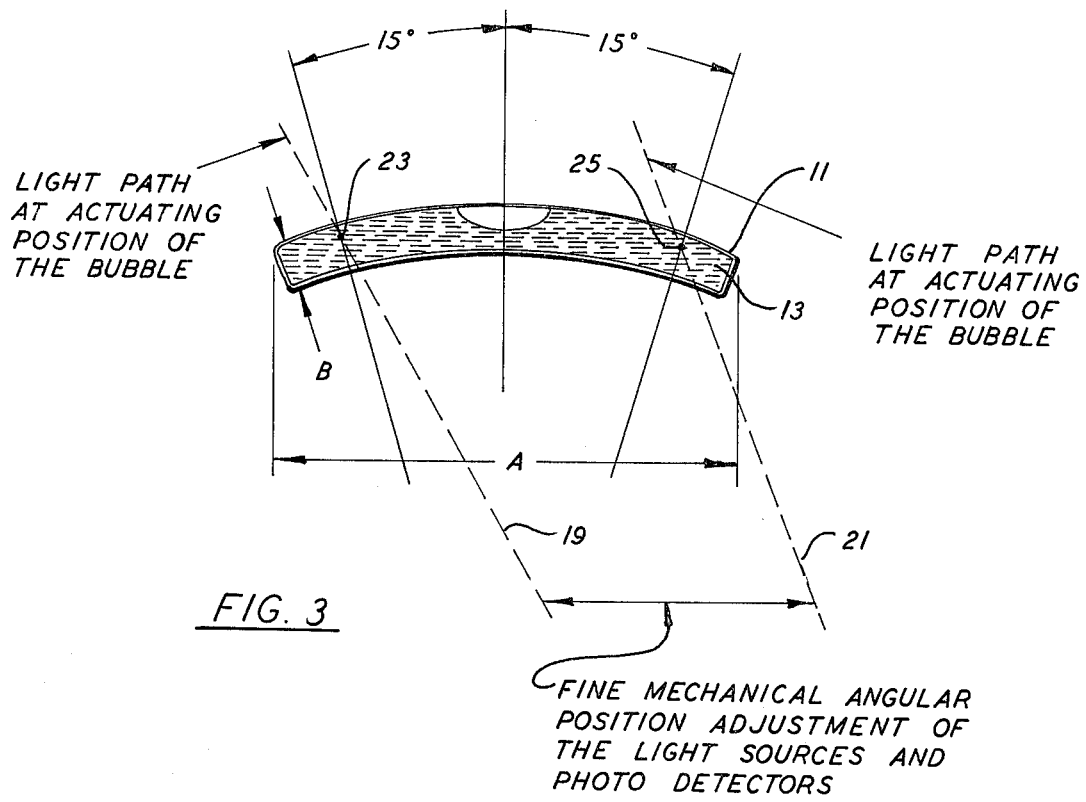
FIG. 3 is a schematic view of the vial of the FIG. 1 illustrating the basic principle upon which the present invention operates.

FIG. 3 is a schematic illustration of the manner in which the detector light paths are arranged. Shown is a vial 11 containing opaque liquid 13 with a bubble 15. In this embodiment the vial is set up to measure tilts of 15° to either side. Typically, the length dimension a would be 80 mm and the height dimension b 8 mm. This assumes the square cross section of FIG. 2a. The light sources and detectors are set up along the paths 19 and 21 respectively so as to intersect the vial at points 23 and 25. The positioning of the light source and photo detectors is carried out so that they accurately detect the desired angle, i.e., 15°.

Figure 4:
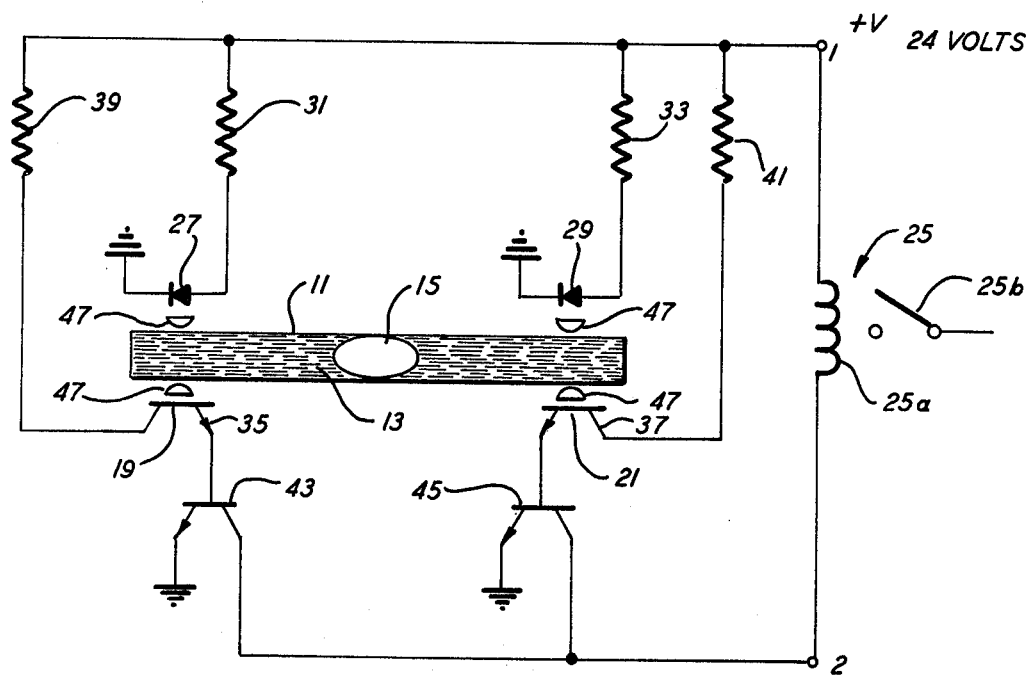
FIG. 4 is an electrical schematic view illustrating a first embodiment of the present invention.

FIG. 4 illustrates a first embodiment of the vial present invention in combination with a light source-detector arrangement. This arrangement is designed to operate a relay 25 having a relay coil 25a and contacts 25b when the desired tilt is reached. Shown is the vial 11 filled with opaque fluid 13 and bubble 15 as described before. At the lines 19 and 21 of FIG. 3 the light source photo detector arrangements are placed. In the illustrated embodiment, the light sources comprise light emitting diodes 27 and 29 respectively. The light emitting diodes 27 and 29 are supplied with a positive voltage, preferably 25 volts through resistors 31 and 33 respectively. The detectors comprise photo transistors 35 and 37 respectively. The photo transistors have their collectors coupled through respective resistors 39 and 41 to the positive voltage source and have their emitters coupled to the respective bases of amplifier transistors 43 and 45. The transistors 43 and 45 have their emitters grounded and their collectors connected in common to one side of the relay coil 25a, the other side of which is connected to the positive voltage. If the vial 11 is tilted sufficiently to either side, the bubble 15 will move to a position where the light from one of the light emitting diodes 27 or 29 will intersect through the bubble along one of the lines 19 or 21 and fall on the photo transistors 35 or 37 causing it to turn on, and thereby turn on transistor 43 or 45 to operate the relay from which an indication may then be obtained. Also shown on the figure are small lenses 47 associated with each of the light emitting diodes and photo transistors.

Figure 5:
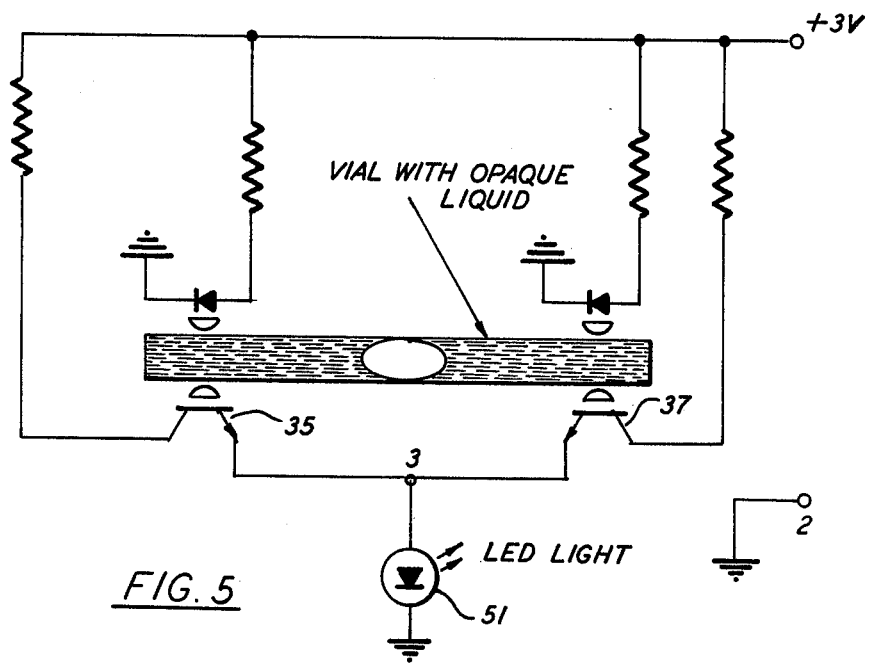
FIG. 5 is a similar view illustrating a second embodiment of the present invention.

FIG. 5 illustrates a further embodiment of the present invention in which the final output is obtained from a light emitting diode 51 in this embodiment the transistors 43 and 45 are eliminated as is the relay 25. The emitters of the transistors 35 and 37 are connected directly to the light emitting diode 51. In other respects the circuit is the same although, it should be noted, it can be driven with a much lower voltage, e.g., 3 volts. A further embodiment of the present invention is illustrated by FIG. 6 which is almost identical to FIG. 4 except that the collectors of the transistors 43 and 45 are connected to indicator lights 61 and 63 respectively having their other terminal connected to the positive voltage and indicating respectively left tilt and right tilt.

Figure 6:
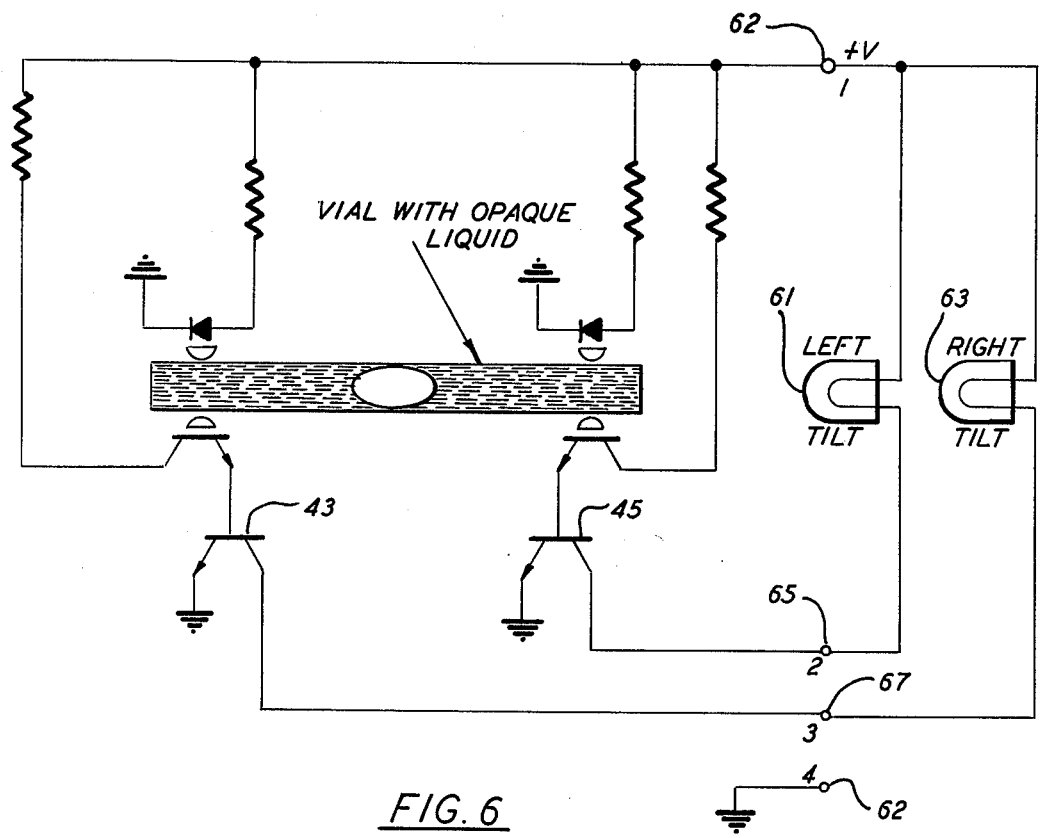
FIG. 6 is a similar view illustrating a third possible embodiment of the present invention.
Figure 7:
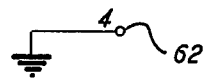
FIG. 7 is a perspective view of the device of FIG. 6 after being encased.

FIG. 7 illustrates in perspective view apparatus such as that of FIG. 6 encased. The device has four terminals 62, 64, 65 and 67 corresponding to the same terminal numbers on FIG. 6. The arrangement of FIG. 4 may be obtained simply by connecting the terminal 67 and 65 together and to an appropriate output device, e.g., a relay. With the embodiment of FIG. 5, only one terminal in addition to the power terminals need be provided for the light emitting diode. Typical dimensions for the device of FIG. 7 include a base 69 having a width of approximately 0.875 inches [22.3 mm] and length of 2.25 inches [57.2 mm]. The overall height including the base and the cover 71 enclosing the vial and electronics can typically be 0.875 inches [22.3 mm]. Instead of the type terminals shown, a locking clip type connector may be provided. The base 69 includes on each side a mounting hole 73 so that it may be bolted into place.

Figure 8:
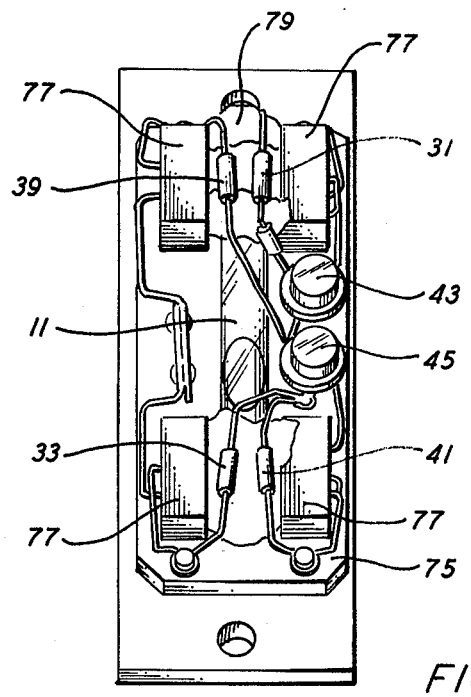
FIG. 8 is a plan view of the apparatus of FIG. 7 illustrating the physical arrangement of the various elements of the present invention.
Figure 9:
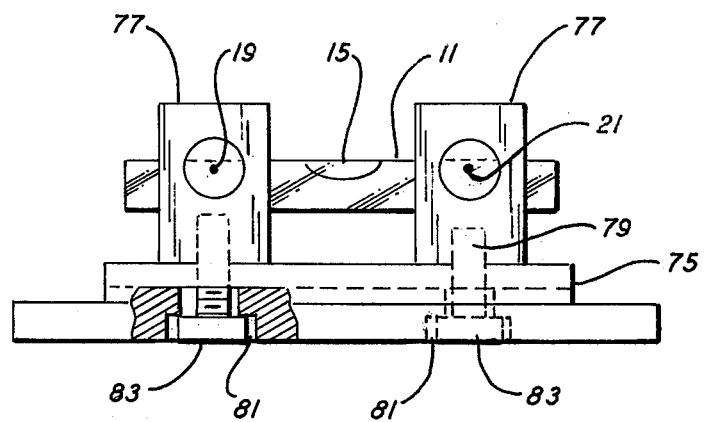
FIG. 9 is a view illustrating the manner in which adjustment of the device of FIG. 8 may be carried out.

FIG. 8 illustrated a plan view of the inside of the arrangement of FIG. 7. Mounted to the base 69 is a holder 75 for the vial 11. the vial is held in place in blocks 77, one being disposed at each end. The blocks contain cut outs for receiving the light emitting diodes 27 and 29 and photo transistors 35 and 37 respectively. Preferably, the blocks are made with threaded holes in their bottom and are secured in place by bolting from the bottom of the member 75 through slotted holes permitting alignment. The light emitting diodes and photo transistors, since they are contained within the block 77 cannot be seen on this figure. However, the transistors 43 and 45 are visible as are the resistors 31, 33, 39 and 41. During construction, the blocks 77 with their components are put in place, the vial placed in the cradle they form. Thereafter, the necessary wiring is carried out and the assembly, without the base 69 put on a test jig where known tilts can be established. The blocks 77 are then adjusted and tightened down so as to obtain an output at the desired angle of tilt whereafter epoxy 79 is used to insure everything stays in place. Thereafter, the cover 71 is placed on the device. This can be more clearly seen from the elevation view of FIG. 9, the blocks 77 form a cradle for the vial 11 an contain in opposite sides thereof [not shown] the respective light sources and photo transistors. The block 77 contain threaded holes 79 and the base 75 contains slotted holes 81 permitting bolts 83 to be inserted therethrough and the member 77 position back and forth on the test jig until the axes 19 and 21 established through the bubble 15 at the desired angle of tilt. Preferably, a threaded hole will be provided on each side thereby permitting adjustment both rotationally and longitudinally to obtain proper alignment.

Particularly when using a square or rectangular vial 11, it is possible to make the base 69 and blocks 77 in one piece and simply expoxy the vial 11 into place properly aligned with the base i.e., so as to be level. This substantially reduces cost without degrading performance appreciably.

What is claimed is:
1. A tilt detecting apparatus comprising:
 (a) a base;
 (b) an elongated vial of rectangular cross-section, said vial containing an opaque liquid filling said vial except for an air bubble remaining in the upper portion of said vial, horizontally supported on said base, said air bubble remaining in the upper portion of said vial;
 (c) a first light source photo transistor combination near one end of said vial, said light source and photo transistor arranged so as to define an optical axis intersecting said vial in its upper portion; and
 (d) a second light source photo transistor combination near the other end of said vial, defining a second optical axis intersecting said vial in its upper portion near said other end, whereby the respective photo transistors of said respective first and second combinations will provide an output when said base is tilted so as to move said bubble into a position where it intersects said first or second optical axis, said vial having a shape such that said optical axis intersect said vial at an angle which is approximately 90°.

2. Apparatus according to claim 1 wherein said cross-section is square.

3. Apparatus according to claim 1 and further including output means coupled to said photo transistors.

4. Apparatus according to claim 1 wherein said output means comprise first and second driver transistors coupled respectively first and second photo transistors and indicating means coupled to the output of said driver transistors.

5. Apparatus according to claim 3 wherein said indicating means comprise first and second lamps coupled respectively to the outputs of first and second driver transistors.

6. Apparatus according to claim 3 wherein the outputs of said first and second drivers transistors are coupled together and wherein said indicating means comprise a relay coupled to said outputs tied together.

7. Apparatus according to claim 1 wherein said output means comprise a light emitting diode coupled to the output of said photo transistors.

8. Apparatus according to claim 1 wherein each of said light sources and photo transistors are disposed in a mounting means supported on said base and further including means for adjusting the positioning of said mounting means on said base to thereby accurately align said first and second axes.

9. Apparatus according to claim 6 wherein said means for adjustment comprised tapped holes in said mounting means and recessed slots in said base, and bolts inserted through said recessed slots into said threaded holes whereby said mounting means may be adjusted and then rigidly bolted in place.

10. Apparatus according to claim 1 wherein said vial is supported in cradles at each end integral with said base, said cradles including cut outs supporting said light sources and photo transistor on opposite sides and further including epoxy attaching said vial to said base.

11. A tilt detecting apparatus comprising:
 (a) a base;
 (b) an elongated vial of eliptical cross-section with a major axis of the elipse oriented vertically with respect to said base, said vial containing an opaque liquid filling said vial except for an air bubble remaining in the upper portion of said vial, horizontally supported on said base, said air bubble remaining in the upper portion of said vial;
 (c) a first light source photo transistor combination near one end of said vial, said light source and photo transistor arranged so as to define an optical axis intersecting said vial in its upper portion; and
 (d) a second light source photo transistor combination near the other end of said vial, defining a second optical axis intersecting said vial in its upper portion near said other end, whereby the respective photo transistors of said respective first and second combinations will provide an output when said base is tilted so as to move said bubble into a position where it intersects said first or second optical axis, said vial having a shape such that said optical axis intersect said vial at an angle which is approximately 90°.

12. Apparatus according to claim 11 and further including output means coupled to said photo transistors.

* * * * *